H. A. SPILLER.
FINISHING, ASSORTING, AND PACKAGING MACHINE.
APPLICATION FILED MAR. 3, 1909.
1,098,061.
Patented May 26, 1914.
12 SHEETS—SHEET 1.
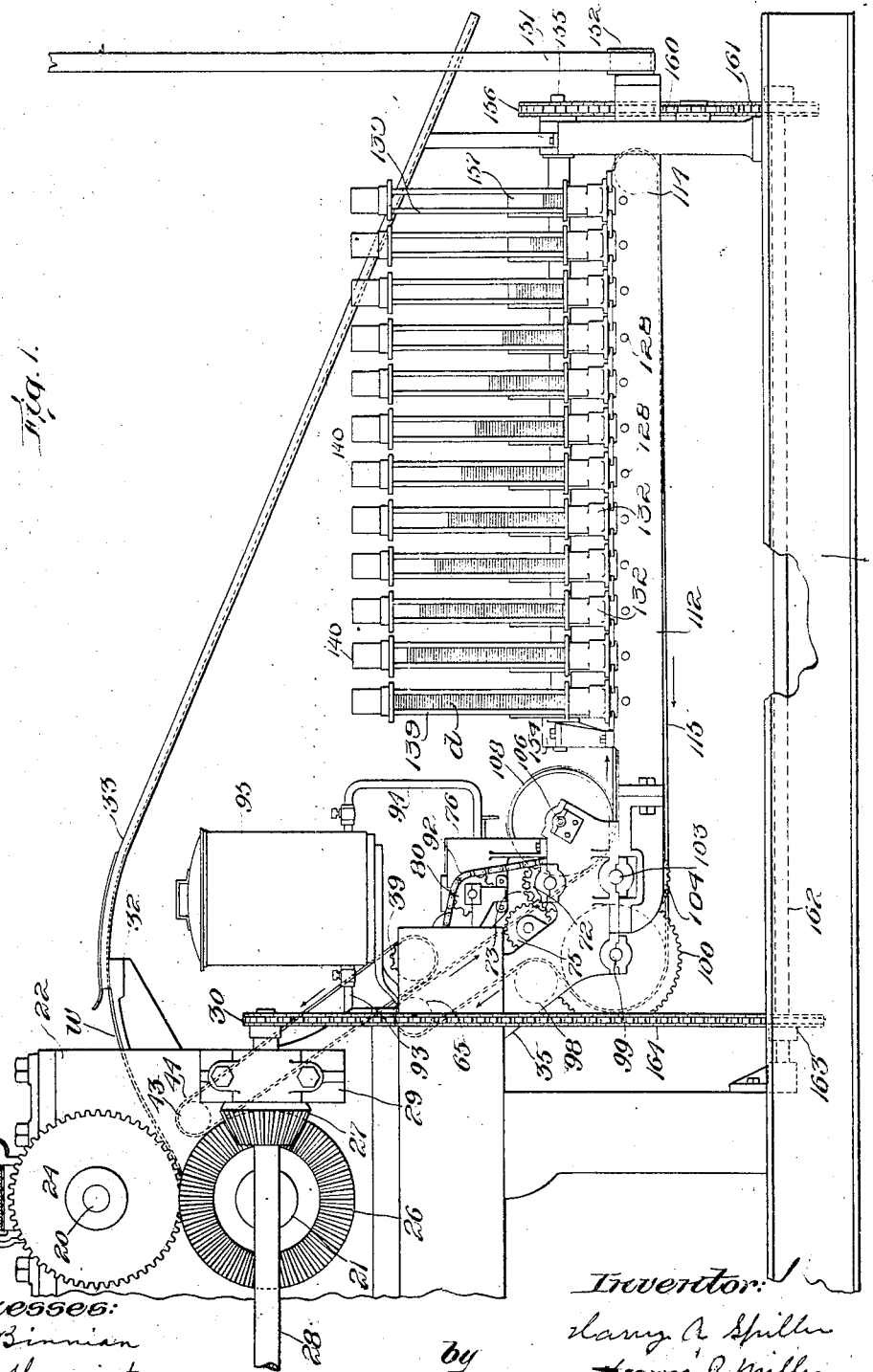

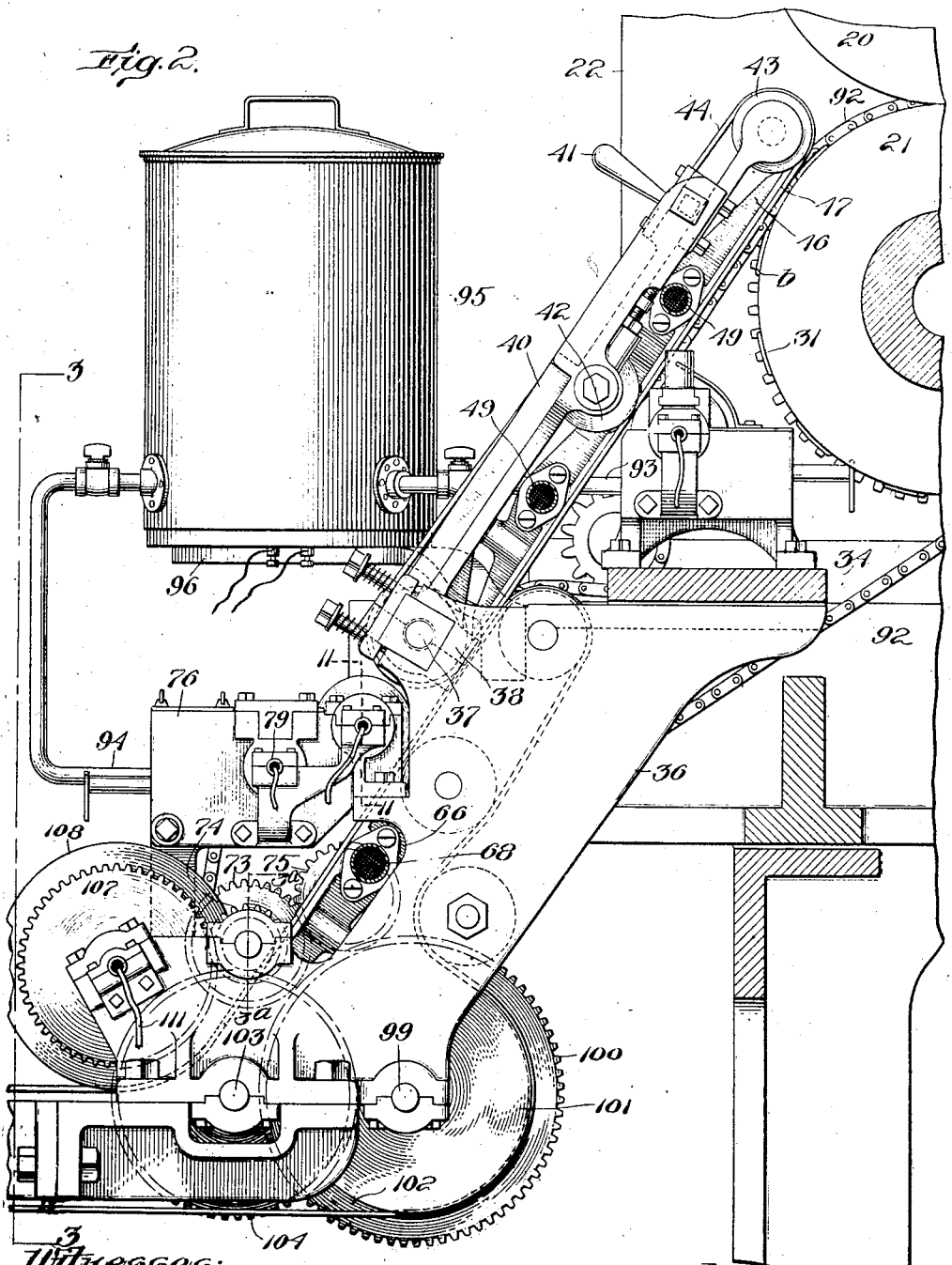

H. A. SPILLER.
FINISHING, ASSORTING, AND PACKAGING MACHINE.
APPLICATION FILED MAR. 3, 1909.
1,098,061.
Patented May 26, 1914.
12 SHEETS—SHEET 3.
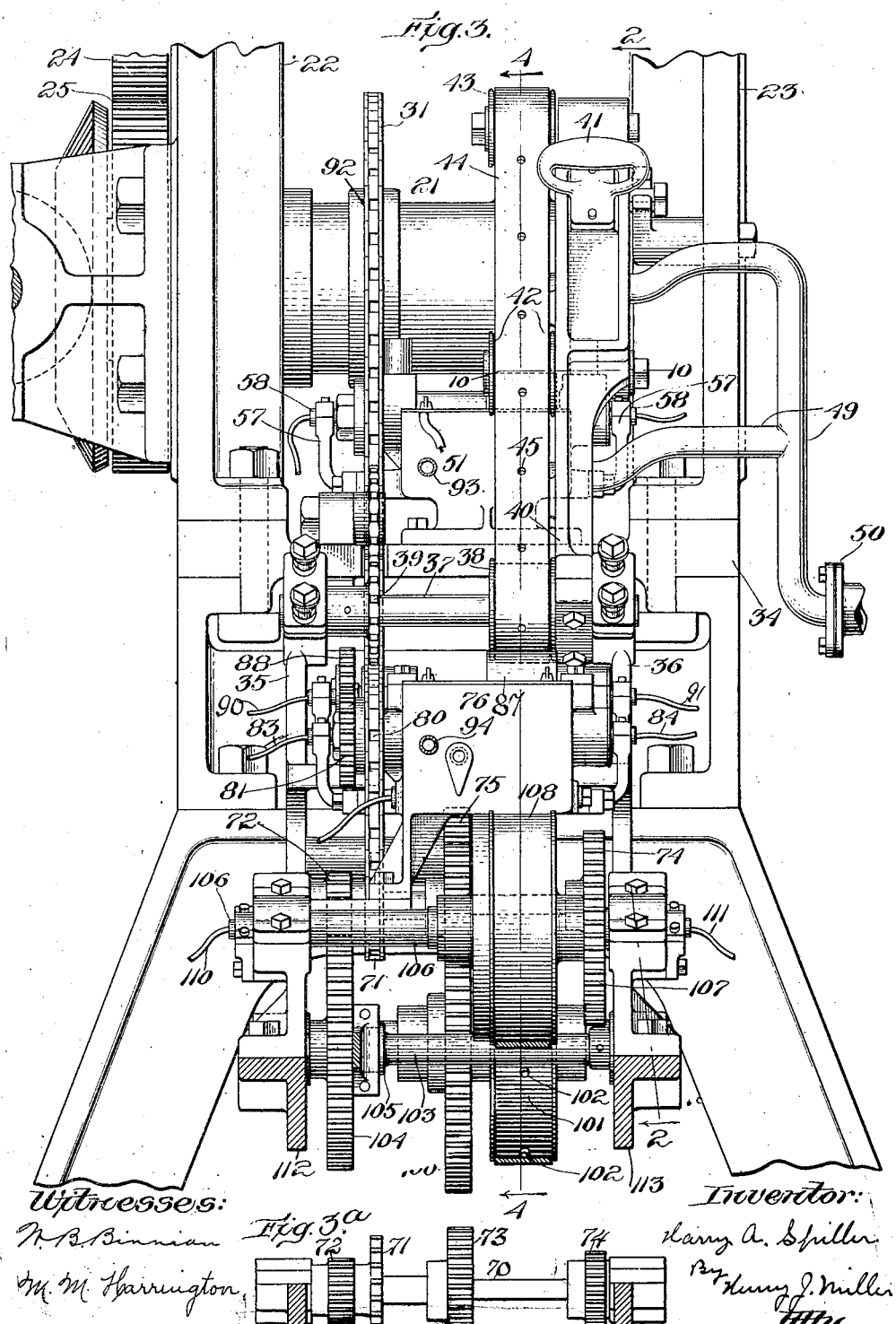

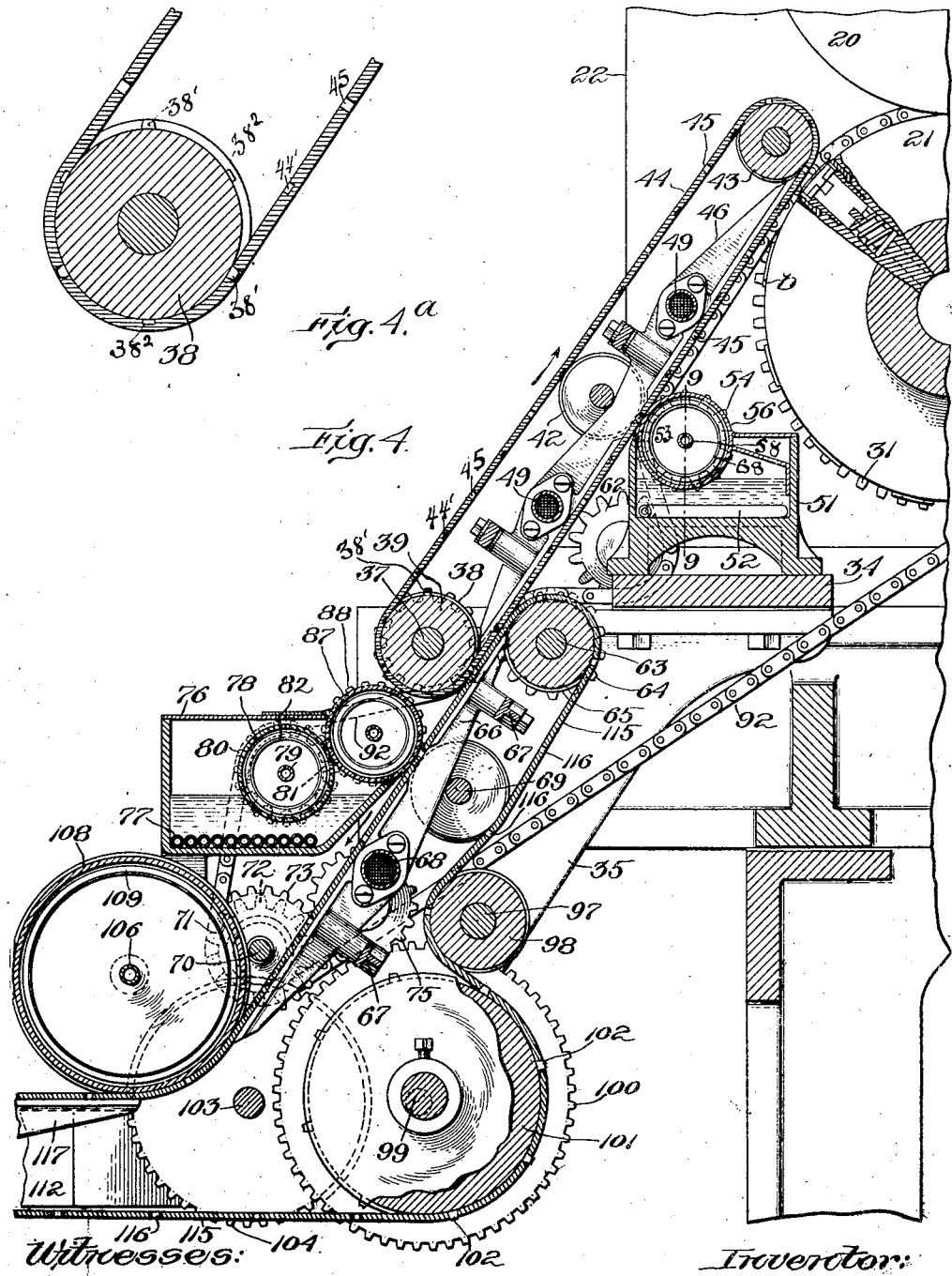

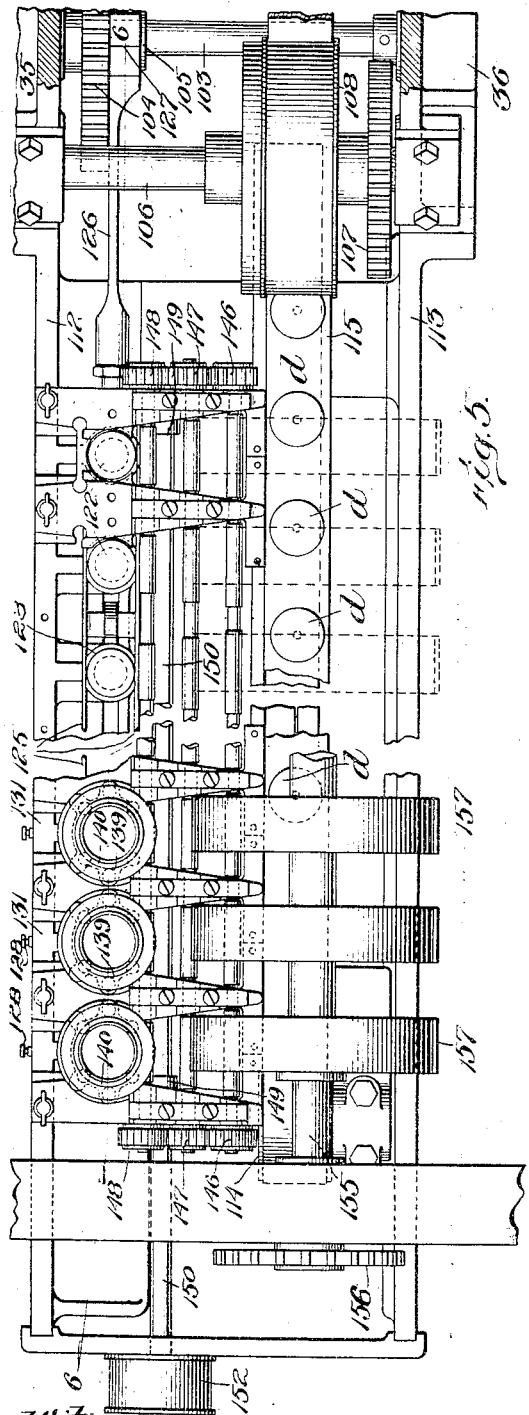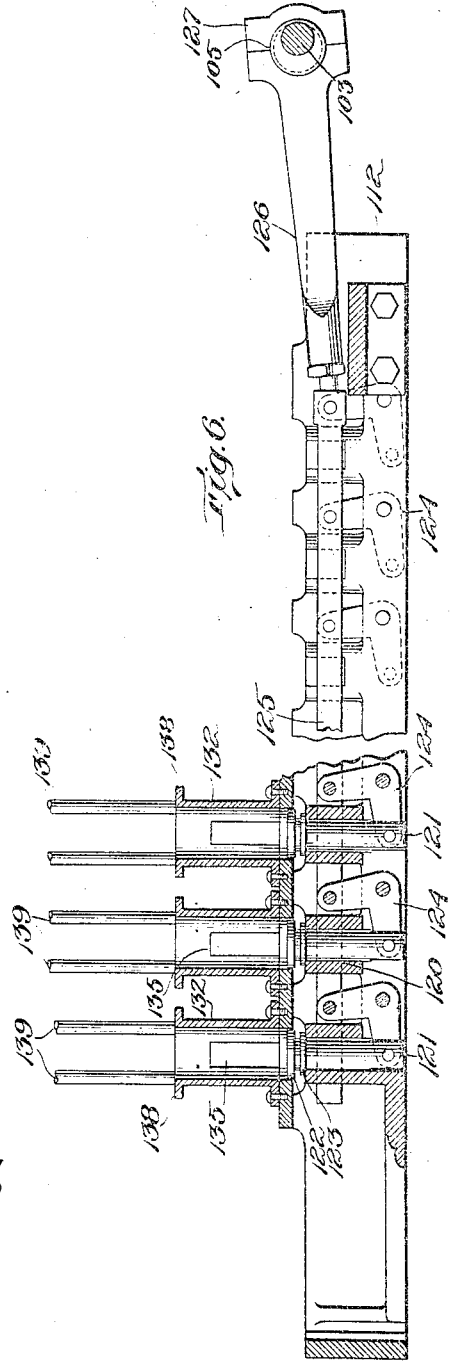

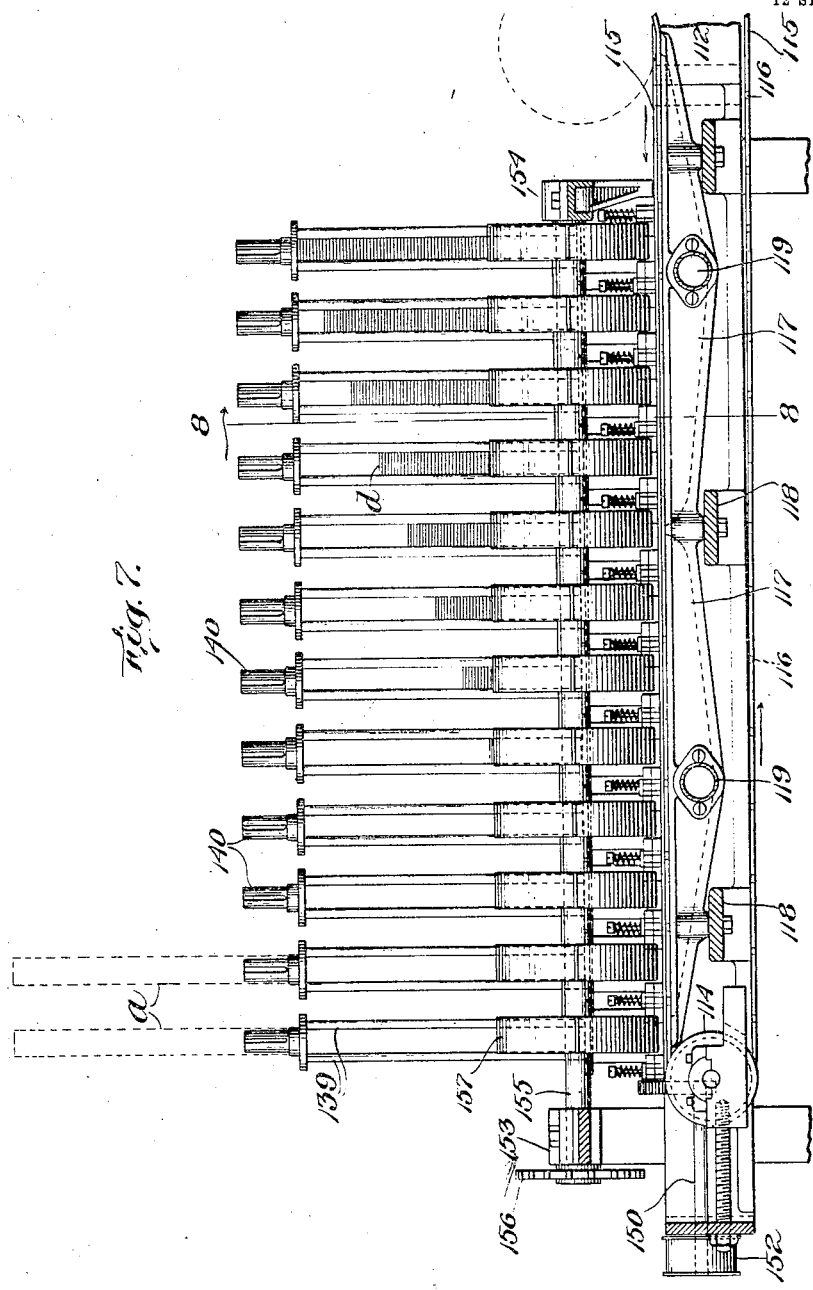

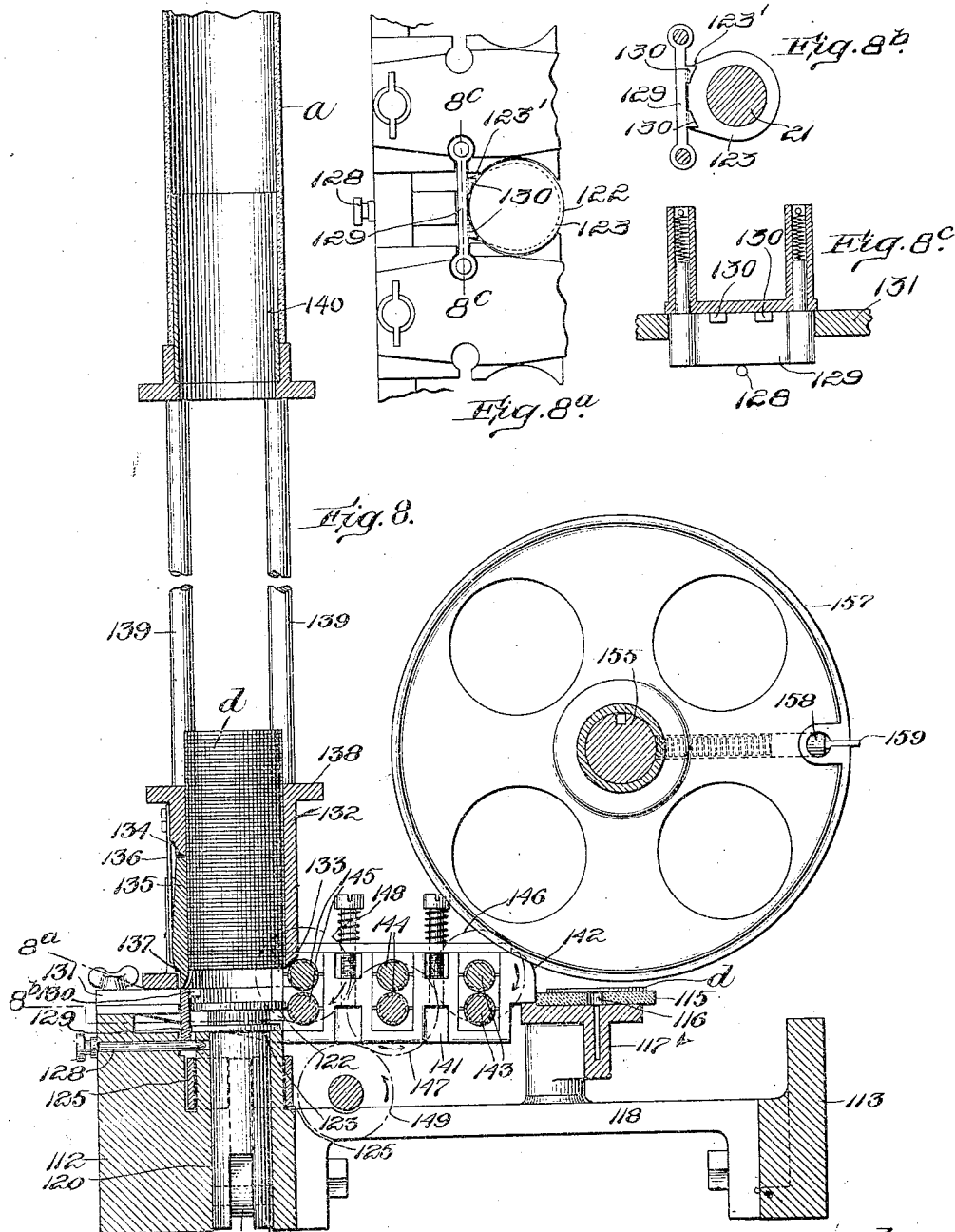

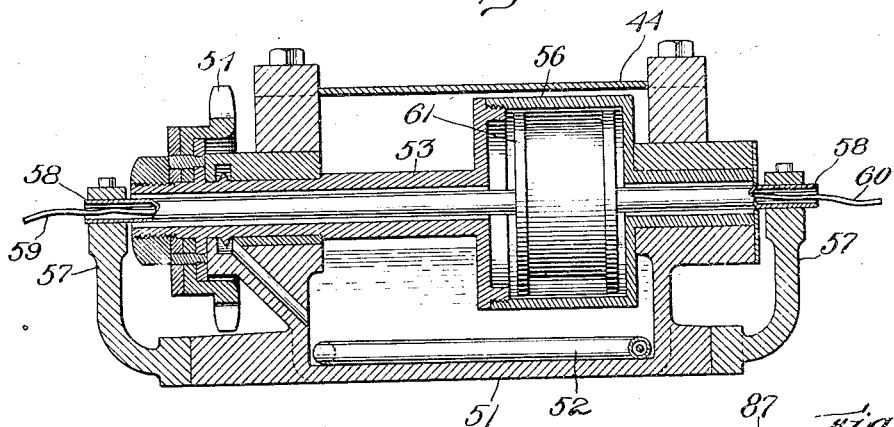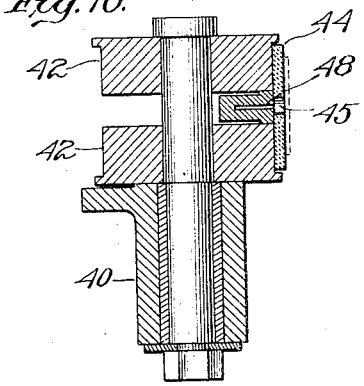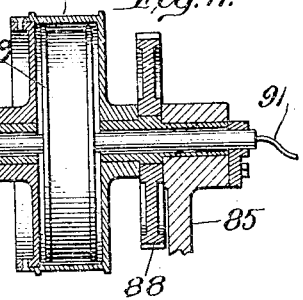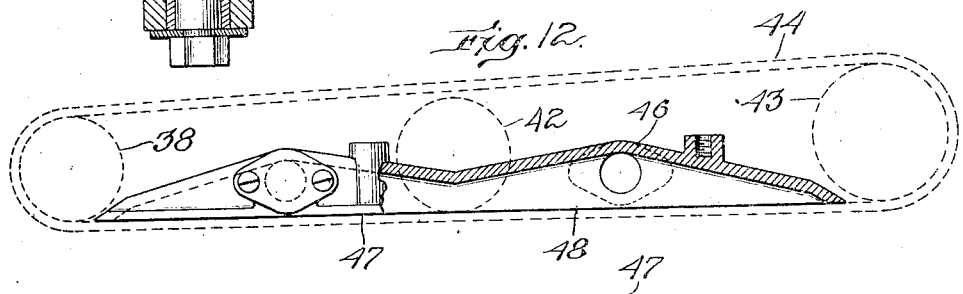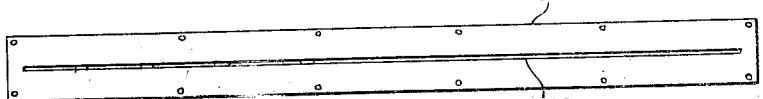

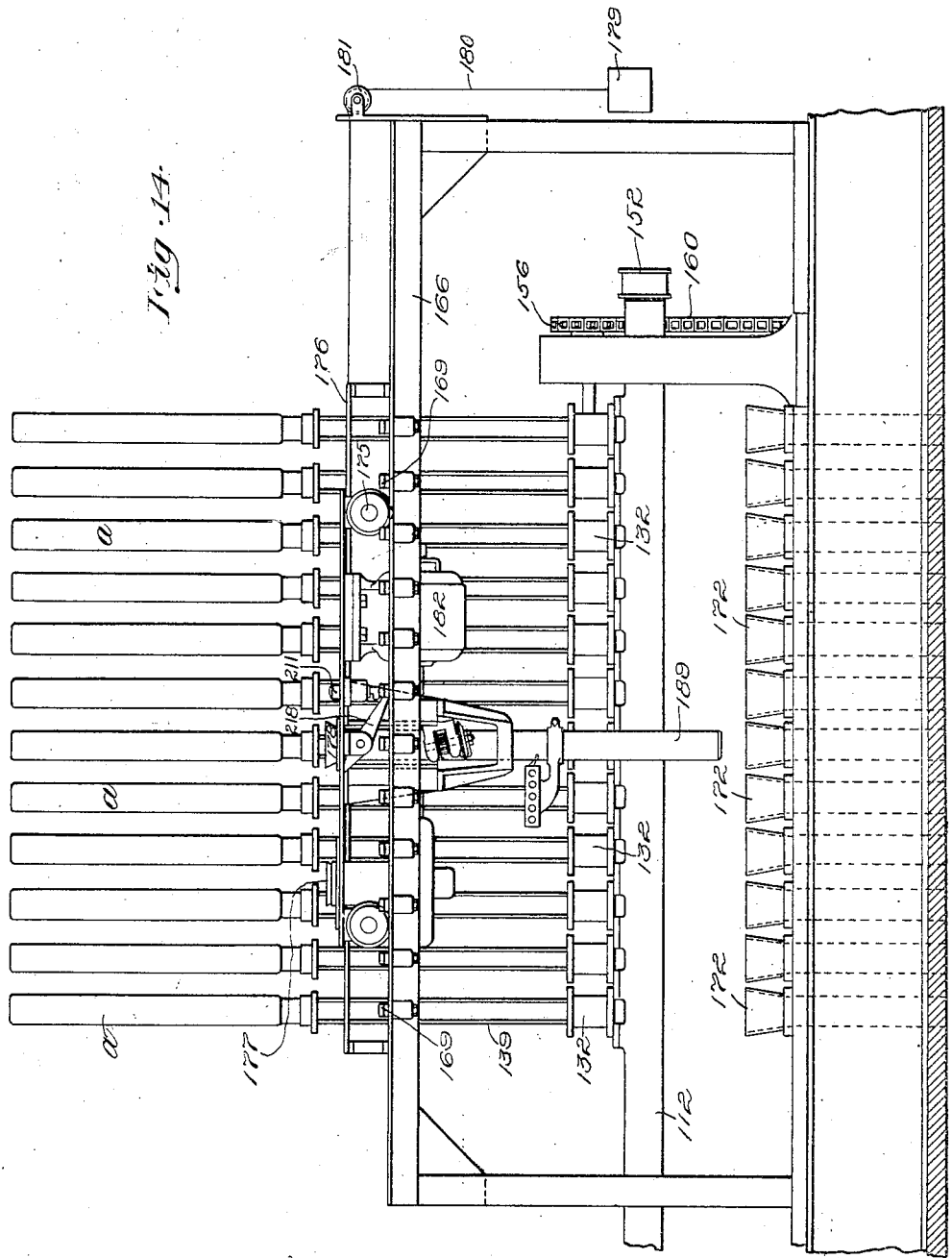

H. A. SPILLER.
FINISHING, ASSORTING, AND PACKAGING MACHINE.
APPLICATION FILED MAR. 3, 1909.

1,098,061.

Patented May 26, 1914.

Witnesses:
N. B. Binnian
M. M. Harrington.

Inventor:
Harry A. Spiller
By Henry J. Miller
atty.

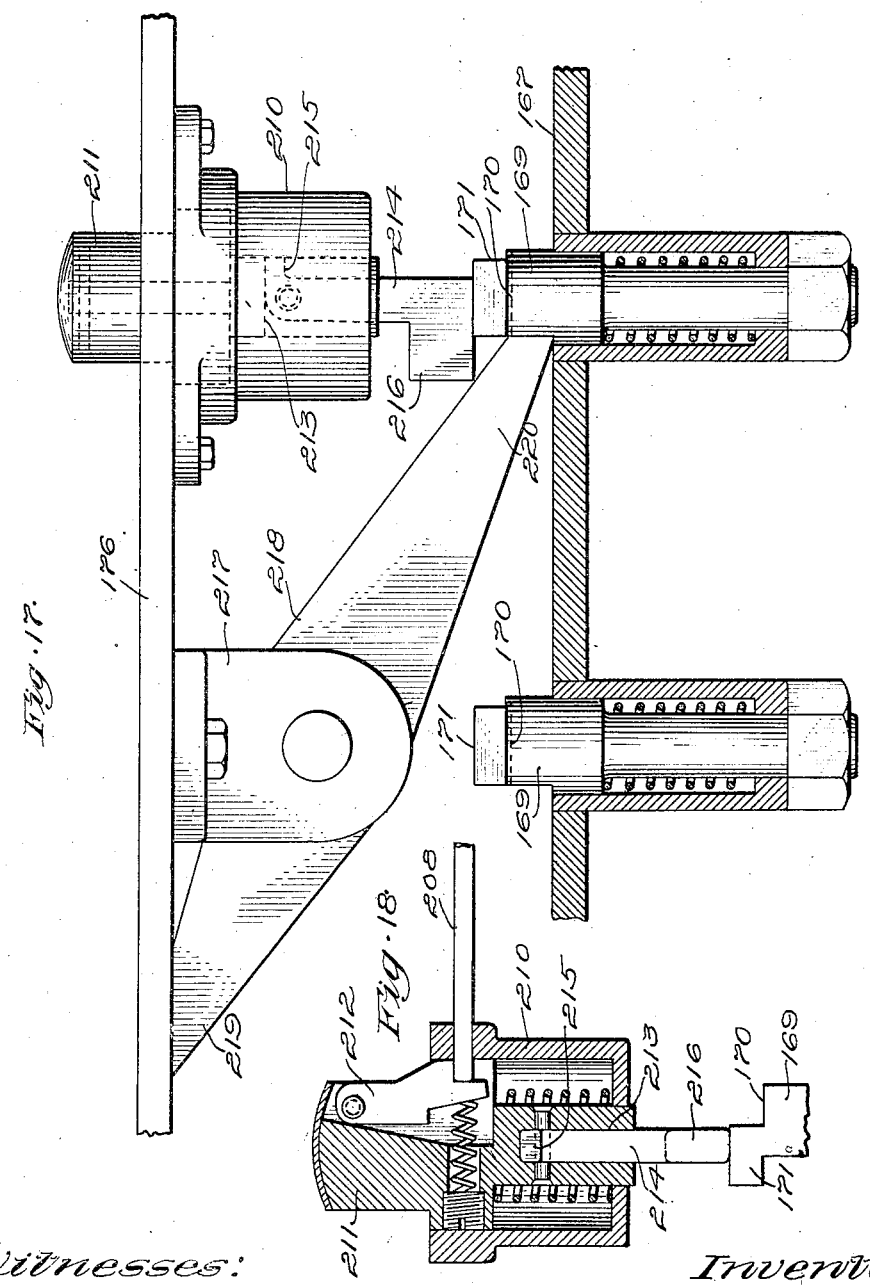

H. A. SPILLER.
FINISHING, ASSORTING, AND PACKAGING MACHINE.
APPLICATION FILED MAR. 3, 1909.

1,098,061.

Patented May 26, 1914.
12 SHEETS—SHEET 12.

Witnesses:

Inventor
Harry A. Spiller
By Henry J. Miller
atty.

UNITED STATES PATENT OFFICE.

HARRY A. SPILLER, OF BOSTON, MASSACHUSETTS, ASSIGNOR TO BROWN-BINNIAN COMPANY, OF BOSTON, MASSACHUSETTS, A CORPORATION OF MASSACHUSETTS.

FINISHING, ASSORTING, AND PACKAGING MACHINE.

1,098,061.  Specification of Letters Patent.  Patented May 26, 1914.

Application filed March 3, 1909. Serial No. 481,135.

*To all whom it may concern:*

Be it known that I, HARRY A. SPILLER, of Boston, in the county of Suffolk and State of Massachusetts, have invented certain new and useful Improvements in Finishing, Assorting, and Packaging Machines, of which the following is a specification, reference being had to the drawings forming part thereof.

This invention relates to improvements in machines for progressively finishing, assorting and packing articles, and assorting the packages thereof, which articles frequently are of differing design, and the invention refers particularly to such a machine designed to receive comparatively thin articles preferably from a preliminary machine, in which said articles are formed or are operated upon; to feed said articles forward through finishing mechanism, designed preferably, to apply coatings of finishing material to said articles, and to deliver said articles to assorting means whereby said articles are or may be assorted according to their design and distributed to packing mechanisms which operate to stack the articles and feed said stacks into suitable wrappers. The various wrappers preferably containing only articles of the same design. And the invention contemplates the assorting of the packages.

The invention consists in such peculiar features of construction and novel combinations of parts and interrelated groups of parts as shall hereinafter be more fully described and pointed out in the claims.

Figure 19:
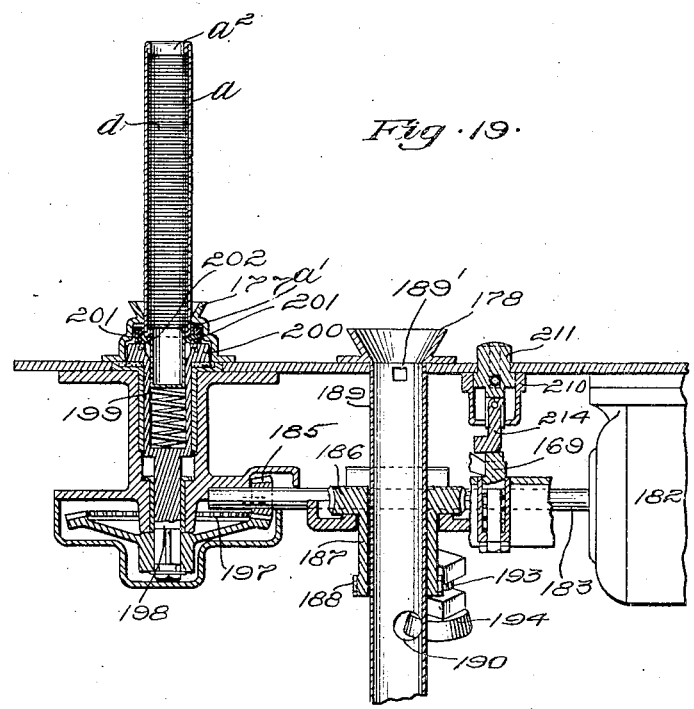

Figure 1, represents a side elevation of the improved machine shown in combination with a machine for printing and cutting paper disks which forms the subject matter of my copending application for patent, Serial No. 407,676, filed December 23, 1907. Fig. 2, represents an enlarged sectional elevation of parts of the same taken on line 2—2 Fig. 3. Fig. 3, represents an end view of Fig. 2, partially in section taken on line 3—3 Fig. 2, parts of the same being omitted. Fig. 3ª, represents a sectional view taken on line 3ª—3ª Fig. 2. Fig. 4, represents a sectional view of some of the mechanism taken on line 4—4 Fig. 3. Fig. 4ª, represents a similar sectional view on an enlarged scale to more clearly show the construction of the upper disk carrying belt and one of its driving pulleys. Fig. 5, represents a plan view of portions of the machine. Fig. 6, represents a partial sectional view taken on line 6—6 Fig. 5. Fig. 7, represents a side elevation of the assorting and packing means. Fig. 8, represents an enlarged cross sectional view taken on line 8—8 Fig. 7. Fig. 8ª, represents a sectional plan view taken on line 8ª—8ª Fig. 8, some of the parts being omitted, to more clearly show the gate for intercepting articles, fed to the packaging point, and which gate may be opened to permit the feeding of articles past said packaging point for the purpose of inspection. Fig. 8ᵇ, represents a detail sectional view of the packaging plunger, taken on line 8ᵇ—8ᵇ Fig. 8 shown in relation to the said disk intercepting gate shown in full lines. Fig. 8ᶜ, represents a cross sectional view taken on line 8ᶜ—8ᶜ Fig. 8ª. Fig. 9, represents an enlarged sectional view taken on line 9—9 Fig. 4. Fig. 10, represents a similar view taken on line 10—10 Fig. 3, showing portions of one of the finishing devices. Fig. 11, represents a sectional view of parts of another of the finishing devices taken on line 11, Fig. 2. Fig. 12, represents a side elevation, partly in section, of one of the air exhaust channels shown in relation to its belt which is indicated. Fig. 13, represents a face view of said air exhaust channel. Fig. 14, represents a side elevation of the wrapper crimping and scoring mechanism, and the package assorting means shown in relation to the disk assorting and packing means. Fig. 15, represents a plan view of portions of the disk assorting and packing means and the package assorting means. Fig. 16, represents a sectional view of portions of the wrapper crimping and scoring mechanism and the package assorting machine taken on line 16—16 Fig. 15. Fig. 17, represents an enlarged detail view of parts of the package assorting means to show the means for locking the package assorting table from movement and the mechanism for disengaging said locking means, parts of the mechanism being shown in section as taken on line 17—17 Fig. 16. Fig. 18, represents a sectional view of portions of the package assorting locking mechanism taken on line 18—18 Fig. 15. Fig. 19, represents a sectional view of portions of the package assorting mechanism taken on line 19—19 Fig.

Figure 20:
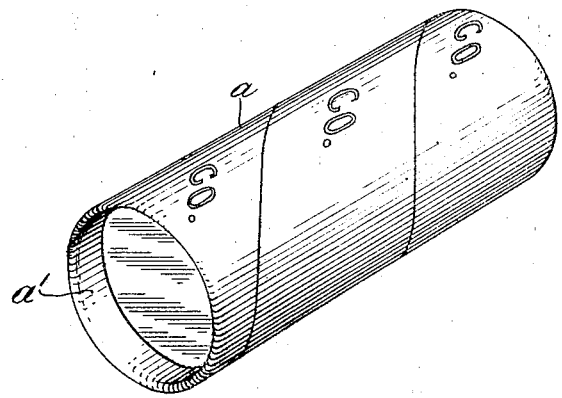

15 and showing means preferably carried by the package assorting mechanism for closing the ends of the packages and also portions of the package wrapper printer and scorer. Fig. 20, represents a perspective view of one of the packages formed on this machine.

Similar numbers of reference designate corresponding parts throughout.

As shown in the drawings in its preferred form 20—21 represent coöperating elements of any well known machine designed to operate on articles of a nature adapted to be received, carried forward, assorted and stacked by the mechanism herein described. In the machine now under consideration said elements 20 and 21 represent cylinders journaled in bearings of the frames 22—23 capable of rotating at high speed and furnished with coöperating means for printing or impressing certain portions of a strip of paper fed therebetween and for cutting out such printed or impressed portions to form disks adapted for use as closures for milk bottles or for similar uses. It being obvious however that the printing or impressing may be dispensed with and that the disk need not be circular. The shaft of cylinder 20 is furnished with the gear 24 which meshes with the gear 25 of the shaft of cylinder 21 on which is also mounted the bevel gear 26 driven by the bevel pinion 27 of the drive shaft 28 which latter is journaled in bearings as 29 and is supplied with the sprocket 30 which drives the chain which actuates the disk assorting mechanism. On the cylinder 21 is the sprocket 31, which drives the chain which actuates the disk finishing and carrying mechanism.

Between the frames 22—23 is mounted the support 32 for the chute 33 adapted to receive the strip of waste $w$ as it passes from between the operative elements of cylinders 20 and 21 (see Fig. 1) and to guide said strip to some point of delivery where it will not interfere with the mechanism.

Secured to lower portions of frames 22 and 23 is the cross plate 34 from which depends the inclined frames 35 and 36 having bearings mounted to yield under strain in which is journaled the shaft 37 furnished with the belt pulley 38 having the pins $38^1$ and $38^2$, shown in Fig. $4^a$ and with the sprocket 39 driven by the chain 92 (see Fig. 4). On the shaft 37 is journaled the frame 40 (Fig. 3) having the handle 41 and furnished with the rotatable belt pulleys 42 and 43 on which and on pulley 38, is mounted the flexible disk conveying belt 44 having the pockets $44^1$ which register with the pins $38^2$ of pulley 38 and the perforations 45—45, one for each disk, which perforations register with pins $38^1$ of said pulley 38. The belt is driven by the rotation of the pulley 38 and the pockets $44^1$ and perforations 45 are respectively engaged by the pins $38^1$ and $38^2$ of pulley 38 to prevent the slipping of belt 44 and the introducing of an irregularity into the machine. Mounted on the frame 40 and located between the reaches of belt 44 is the air exhaust chamber 46 which extends between belt pulleys 38 and 43, see Fig. 10, and has a flat face 47 bearing against the lower reach of the belt 44 and having the longitudinal slot 48, as shown in Fig. 13, which extends in line with the perforations 45 of belt 44 and, in the operation of the machine, is designed to receive the inflow of air passing through said perforations 45, when air is exhausted from said chamber 48, and thus, when said perforations 45 are covered by disks under operation, to exert suction on said disks to hold them against belt 44 during the passage of said belt over the slot 48. Communicating with openings of the chamber 46 are air pipes 49—49 which are connected together and are also connected with any suitable air exhaust device by a pipe having the swivel joint 50 located in axial relation to the shaft 37, see Fig. 3, whereby the frame 40 may be swung on said shaft, without disconnecting said pipes 49, to bring the upper end portion of the belt 44 in close proximity to the periphery of the cylinder 21 during the operation of the machine and to withdraw the same when desired.

On the cross plate 34 is mounted the tank 51 adapted to contain a supply of wax principally paraffin, or similar wax or coating or finishing material, if the articles are to be coated or finished; said tank 51 being furnished with the heating element 52 preferably electrical. Journaled in bearings in the ends of the tank 51 is the tubular shaft 53 having the sprocket 54 and furnished within said tank 51, with the cylindrical drum 56 the periphery of which, when said shaft 53 is rotated, works through an opening in the tank 51, see Fig. 4, to deliver a portion of the contents of the tank 51 to the disks or other articles carried forward by the lower reach of the belt 44 over said drum and sufficiently close thereto to receive the coating or finishing material from said drum. Extending from the ends of tank 51 are arms 57—57 in which are supported the tubular conduits 58—58 located within the tubular shaft 53 and designed to carry the electrical circuit wires 59—60 to and from the electrical heater 61 located within the chamber 56. At one end of the support 34 for said tank 51 is mounted a shaft on which is journaled the idle guide sprocket 62 for the drive chain which operates sprockets 39 and 54 which chain will hereafter be more particularly referred to.

Below the plate 34, in the frames 35 and 36 is journaled the shaft 63 having the sprocket 64, driven by a chain hereinafter referred to, and the belt pulley 65. Extending downward at an inclination from pulley 65 is the air exhaust chamber 66 which is supported on cross members 67—67 between the frames 35 and 36 similar to the chamber 46 above described and shown in Figs. 12 and 13 having a flat face similar to the face 47, of said chamber 46, furnished with a longitudinal slot as 48 and having air outlets communicating with pipe 68, through which air may be exhausted in any well known manner. Adjacent said exhaust chamber 66 is mounted, in the frames 35 and 36, the shaft 69 carrying an idler belt pulley.

In bearings at the lower portion of frames 35 and 36 is journaled the shaft 70 having the sprocket 71 driven by the chain 92 hereafter described and the pinions 72, 73 and 74 of which the pinion 73 meshes with the pinion 75 journaled on a shaft extending from frame 35.

Mounted on brackets extending from the frames 35 and 36 is the tank 76 having the electrical heater 77 for the waxy material contained therein and furnished with the cylindrical chamber 78 the tubular shaft 79 of which is journaled in bearings, in arms extending from said tank, and is furnished, exteriorly of said tank with the sprocket 80 driven by the chain 92 and the gear 81. Electrical heating means 82 are located within the chamber 78 which are supplied with electrical current by means of the circuit wires 83—84.

Journaled in arms 85—85 extending from said tank is the tubular shaft 86 having the cylindrical delivery chamber 87, in contact with the cylindrical chamber 78, and the gear 88 which is driven from the gear 81. Within the chamber 87 is the electrical heating element 89 to which electrical current is supplied by means of the circuit wires 90 and 91.

The various sprockets and mechanism for rotating the belt pulleys and the wax supplying rolls are driven by the chain 92 which is engaged with and driven from the sprocket 31, on the shaft of the cylinder 21, and engages the sprockets 54, 62, 64, 39, 71 and 80 of the several belt driving and coating delivering devices.

Disk coating or finishing material, preferably of a waxy nature is supplied to the tanks 51 and 76 through pipes 93 and 94 communicating with the respective tanks and with the main tank 95 supported on the bracket 96 extending from the frame 35. It is of course necessary to maintain the contents of this tank 95 in a fluid condition so that such contents may flow readily through the pipes 93 and 94.

Near the lower portions of the frames 35 and 36 is secured the shaft 97, Fig. 4, carrying the rotatable belt pulley 98 and below said pulley the shaft 99 is journaled in bearings in said frames and is furnished with the gear 100, driven from pinion 75, and the belt pulley 101 having the belt engaging studs 102—102. At this portion of the machine is journaled the shaft 103, having the gear 104, driven from gear 72, and furnished with the eccentric 105, to reciprocate the packaging plunger, hereinafter referred to, see Figs. 5 and 6. Adjacent the lower end of the air exhaust chamber 66 is journaled the hollow shaft 106 having the gear 107 driven from the gear 74 and the hollow drum 108 furnished with any interiorly located electric heating device 109 to which electrical current may be supplied by circuit wires 110—111.

From the lower ends of the frames 35, 36 extend the frame members 112—113 suitably braced and supported and having near their outer ends a shaft carrying the belt pulley 114. The belt 115, having a series of perforations 116—116 suitably spaced is mounted on the pulleys 65, 98, 101 and 114 and bears against pulley 108, the reach of said belt 115 between pulley 65 and 108 moves in contact with the slotted face of the air exhaust chamber 66, in the direction indicated by the arrow, and, between the pulleys 108 and 114, said belt passes along over the longitudinally slotted face of the air exhaust chamber 117, supported between the frame members 112—113 on braces as 118, which is similar in construction to the chamber shown in Figs. 12 and 13 and is furnished with the air exhaust pipes 119—119. During the return movement of said belt 115 it passes over the belt pulley 101 and the perforations 116 of said belt are engaged by the spurs 102 of said pulley, so that said belt is driven by the pulleys 65 and 101 the spur 102 making the rate positive.

Frame member 112 has a series of vertical bores 120 in which is slidably mounted the plungers 121—121 having at their upper ends the enlarged heads 122 and the collars 123 of greater diameter than the bores 120 and having the extensions $123^1$, see Figs. $8^a$ and $8^b$. Pivotally mounted adjacent the bores 120—120 are bell crank levers 124—124 which are pivotally connected with the plungers 121—121 and with the connecting rods 125—125 adapted to be intermittently reciprocated by the rod 126 connected with said rods 125—125 and having the frame 127 embracing the eccentric 105 of shaft 103 which shaft, as above stated, is rotated by pinion gear 73 engaged with gear 104 of said shaft 103.

The member 112 has a series of transverse perforations to receive the pins 128—128 Figs. 5 and 8, on each of which is normally supported a back plate or disk intercepting plate 129 having the inwardly extending ears 130—130 which clear the head 122 of the associated plunger 121 but which are or may be engaged by the extension 123¹ of the collar 123 of said plunger during the upward movement of said plunger to lift said plate 129 sufficiently to permit the insertion of the pin 128 thereunder; such movement of plate 129 being resisted by springs carried by sockets of the plate 131 and bearing on the upwardly extending guide arms of said plate 129 which are free to move in said sockets, see Fig. 8ᶜ.

In transverse guides formed in the upper portion of frame member 112 are slides 131—131 carrying the receivers 132—132 having openings 133 and 134 in the latter of which are the press plates 135, acted upon by the springs 136 of said receivers and having the projections 137 with curved lower ends. The upper ends of said receivers 132 have collars 138 in which are secured rods 139—139 forming vertical frames furnished at their upper ends with sleeves 140—140 adapted to receive the lower ends of wrappers a—a, Figs. 7 and 8, of a cross sectional shape adapted to receive a stack of the disks or other articles operated upon by this machine.

Mounted between the frame member 112 and the air exhaust chamber 117 are frames 141—141 having the inner curved ends 142—142 and furnished with bearings, mounted to yield under strain, in which are journaled pairs of feeding and polishing rolls 143—144 and 145 driven by their gears 146—147 and 148 through the medium of gears 149—149, on shaft 150, meshing with said gears 147 while the shaft 150 is driven by belt 151 working on pulley 152 of said shaft and driven from any source of power.

The transverse frames 153—154 are mounted on the frame members 112 and 113 and in these frames 153—154 is journaled the shaft 155 having the sprocket 156 and furnished with a series of circular members 157—157 for removing the disks from the belt placed over the belt 115 each of which members 157 has a radial way or socket in which the outwardly spring pressed shank 158 of the blade 159 is slidable; the outward movement of said shank being limited by the contracted slot in said member 157 through which blade 159 is free to move outwardly, under the action of its spring, or inwardly, against the action of said spring, to accommodate the edge of said blade to the surface of the belt 115 over which the edge of said blade rides at each rotation of member 157 to push laterally from said belt 115 one of the disks or other articles d positioned at this particular point and to deliver said article to the feeding action of the rolls 143—143. Shaft 155, carrying the members 157 is driven by chain 160 engaged with sprocket 156 of said shaft and with sprocket 161 of the counter shaft 162 journaled in bearings and having the sprocket 163 driven by chain 164 from sprocket 30.

At the side of the packaging mechanism is suitably mounted a pair of ways 166—167 of which the way 166 is furnished with the rack 168 while the way or rail 167 is provided with a series of spring actuated depressible stops 169—169 having shoulders 170. and the laterally projecting members 171, these stops 169 being spaced apart to correspond to the location of the recesses in the rack 168. Preferably between said ways or rails 166—167 is located a series of package receptacles or chutes 172—172 which are intended to respectively correspond to the respective article or disk stacking means whereby a package taken from any particular one of the herein described disk stacking means may be placed in the corresponding chute 172 intended to receive such particular packages. As one of the means for enforcing accuracy on the part of the operative the chutes 172—172 are respectively in line with their corresponding stops 169—169 and hence are respectively in line with the recesses of the rack 168. In order that this feature of the invention shall be clearly understood attention is again called to the fact that if the machine of which cylinder 21 forms a part is adapted to produce successive series of disks or other articles d of which the individual disks or articles differ in some respect as by shape, design, or the printing thereon, such disks or articles will be positively applied by the preliminary mechanism to belt 44 at regular intervals on said belt, over the perforations 45, and will be carried forward by said belt and transferred to the belt 115 in the same relative order in which order said disks or articles will be brought into position to be acted upon by the blades 159—159 of the article assorting members 157—157 whereby the series of articles or disks are diverted from the path, in which they have moved forward as a series, to separate paths and mechanisms which lead the different disks to their respective receivers. Bearing in mind this assortment of the disks or articles and the placing of the same in their respective packages the importance of positively assorting the packages follows as a logical sequence and with respect thereto this invention is not limited to any specific form or arrangement of mechanism.

On the ways or rails 166—167 is movably mounted a carriage indicated as a whole by numeral 175 provided with the table top 176 having a crimper or package end closing mechanism having the flaring mouth 177 and with the package assorting guide tube 178 which latter is designed to be registered successively with the chutes 172—172 during the movement of carriage 175 under the action of the weight 179 connected with the table top 176 by the flexible connection 180 passing over the pulley 181.

Suitably supported from the table 176 is the electric motor 182 having the shaft 183 journaled in bearings depending from the table 176 and furnished with the worm 184 and the bevel pinion 185, the former of which drives the worm gear 186 rotatably mounted and having the sleeve 187 and the gear 188 the whole embracing the conduit 189 which depends from the flaring mouth 178 and has the openings 190—191 and 192. Meshing with the gear 188 is the pinion 193 the shaft of which is journaled in a bearing and is furnished with the printing or impressing roll or disk 194 which is free to work through opening 190 in the conduit 189. Similarly driven is the pinion 195 which has a shaft rotatably mounted and provided with the saw or scoring disk 196 which may act, through opening 191, on packages passing through the conduit 189, see Figs. 16 and 19.

The bevel pinion 185 drives the gear 197 having the shaft 198 journaled in a vertical bearing beneath the flaring mouth piece 177 and having the socket 199 and the flange 200 carrying the rolls 201—201 journaled in said flange and extending radially toward the spring supported member 202 slidably mounted in the socket 199.

At the under side of the table 176 are guides in which the indicator rod 203, having the head 204 is free to slide whereby its end may enter the conduit 189, through the opening 189$^1$, see Fig. 16, to obstruct said conduit when the head 204 of said rod is received by one of the recesses 168$^1$ in the rack 168 and which rod 203 is moved outward by the riding of the head 204 against the inclined edge of said recess in the rack 168 when the carriage moves forward. The inward or obstructing movement of the rod 203 is effected through the medium of the detector lever 205 which is pivotally mounted on a fitting 206, secured to the conduit 189, and has its upper end pivotally connected with said indicator rod 203 and its lower end 207 free to pass through the opening 192 in said conduit.

The locking rod 208 is actuated from the indicator rod 203 by means of the pivotally connected lever 209 and one end of this locking rod 208 is slidable in a slot formed in the casing 210 of the push button release 211. Said casing 210 is secured to the under side of the table 176 and carries the depressible spring lifted button 211 having the spring actuated pawl 212, adapted to be engaged by the end of rod 208 at times to prevent the depression of said button, and at its lower portion the slot 213 in which is pivotally mounted the plate 214 having the laterally extending finger 215, adapted to limit the swinging of said plate 214 by contact with one wall of said slot 213, while the lower end of said plate has the extension 216 which is in line with the spring lifted stops 169—169.

Depending from the table 176 is the bracket 217 in which is pivotally mounted the carriage detainer pawl 218 the end 219 of which is limited in its upward movement by the table 176 and the lower overbalanced end 220 of which extends in line with the series of stops 169—169 and is designed to be intercepted by the respective stops of said series in succession.

In the operation of the machine cylinder 21 may be considered as having several functions and the parts b—b thereof may be cutters for cutting out disks d—d from a strip of material, of which w indicates the waste, or as a carrier for such disks designed to carry or place the disks in contact with belt 44.

When the machine is started air is drawn from the chambers 46, 66 and 117 and, as the longitudinal slots of said chambers are covered by the belts 44 and 115, respectively associated therewith, air can enter said chambers only through the perforations in said belts. Under these conditions when the perforations 45 of the belt 44 are brought into registration with the disks d—d carried to position by the cylinder 21 said disks adhere to the belt 44 by reason of the suction and are carried forward by said belt against the periphery of the waxing roll 56 whereby the waterproof material from tank 51 is delivered to the disks which are now carried along until they are engaged between the belts 44 and 115 and pass the end of the air exhaust chamber 46 at which time they overlap the ends of the air chamber 66 and register with one of the perforations 116 of said belt 115 and the waxed surfaces adhere, by suction, to this latter belt by which they are carried forward beneath the cylinder 87 which supplies waterproof material to this side of the said disks d—d which are then carried by belt 115 beneath cylinder 108 to a point where the suction created by the exhaustion of air from chamber 117 again causes the disks to adhere to the belt 115. Shaft 155 is preferably so timed as to its rotation that at each rotation thereof a series of disks d—d are brought beneath the series of members 157—157 of said shaft in position to be moved laterally from the belt 115 by the blades 159—159 of said members 157 whereby the disks are moved toward the rolls 143—143 until said disks are engaged between said rolls and are carried forward by the rolls 143—144 and 145 and delivered onto the respective tops 122 of the plungers 121, being limited against further movement by the plate 130. Approximately at this time shaft 103 reaches the point in its rotation when its eccentric 105 effects the reciprocation of the rod 126 and the bell crank connecting rods 125—125 and the bell cranks 124—124 are operated in unison to move upward the plungers 121—121 whereby the disks d—d are carried upward by said plungers into the receivers 132—132 and the stack of disks in said receivers is moved upward until the last added disk is above the edge of the opening 133 and above the upper end of the projections 137 which, when the plungers are retracted, engages the lowest disk of said stack. This operation is continued until the stacks of disks are finally moved upward into the wrappers a—a and said wrappers become filled to the desired point when said wrappers are removed and empty wrappers are substituted. While the disks are in the frame 139 there is ample opportunity for inspecting the product and removing imperfect caps.

If it be understood that the series of disks or other articles d—d delivered by cylinder 21 differ in some respect and said series is equal in number to the series of receptacles 132 and their related mechanisms it will be seen that a series of packages of articles differing in some manner as in the inscription on their face may be formed simultaneously and, as the articles are fed forward by belt 115 they will be positioned and assorted in respective groups or stacks. This is one important feature as, where the articles d—d represent disk closures, for milk bottles, printed with names of various dealers a comparatively large variety of disks having different names may be printed and cut out at each rotation of cylinder 21 and then carried forward through the coating devices to positions in line with the particular receptacles 132—132 to which they are designed to be delivered and then moved simultaneously toward said receptacles by the series of blades 159—159 and by the rolls 143—144 and 145.

Attention is called to the stacks of articles or disks d shown in Figs. 1 and 7 in which the stack of said articles or disks in the stacking device located nearest the bearing 154 extends the full height of rods 139 and the heights of the successive stacks progressively decreases. Ordinarily such stacks would be approximately of the same height as the articles or disks are preferably delivered to all stacking means simultaneously. In order however to facilitate the handling of the filled wrappers a—a by the operative, in removing them from sleeves 140 the pins 128 are removed from the stacking mechanisms at the starting of the machine to permit the plates 129 to move downward and allow the passage of articles or disks through the openings, normally closed by said plates 129, and said pins 128 are then progressively replaced, when plates 129 are in the elevated position, whereby said articles or disks are intercepted by said plates 129 and are moved upward by the action of plungers 121. As articles or disks have, during this progressive closing of the plates 129, been fed forward to the several stacking mechanisms it is obvious that the stacks formed will be progressively of different heights and hence the wrappers will be filled in succession and can be removed in like order, by the operative for the closing of the lower open end of the wrapper and the assorting of the packages.

With the carriage, designated as a whole by numeral 175, in the position, with relation to the article or disk stacking mechanisms, shown in Fig. 14 it is to be presumed that the first five wrappers, in the series, with their articles have been removed; that empty wrappers a—a have been placed on the sleeves 140 of said five stacking mechanisms and that the carriage 175 has just reached the position shown in said Fig. 14 with its conduit 189 registering with the sixth package receiver or chute 172; with the pawl 218 engaged with one of the stops 169 to hold the carriage 175 in such position, and with the parts 203 to 214 in the positions shown in Figs. 15, 16 and 17.

The wrapper a with its contents is now removed from the sixth sleeve 140 and its open end is inserted in the flaring mouth 177 of the wrapper end turning device or crimper with the stack of articles or disks resting on the depressible member 202 and the end of the wrapper a resting against the rolls 201 which rotate with the member 200, driven through gears 185 and 197, and, as the wrapper a is pressed down, effect the turning inward and upward of the edge of the wrapper, as is shown in Figs. 19 and 20, to form an annular shoulder $a'$ similar to shoulder $a^2$ at the other end of said wrapper a. The package is now removed from the mouth piece 177 and is inserted in the mouth 178 and allowed to pass downward by gravity, in which movement the package is preferably printed or impressed with the characters or symbols on the roll 194 and may be scored by the disk 196. In its downward movement said package acts on the end 207 of lever 205, to effect the moving outward of this end of said lever and the moving inward of the upper end thereof with its associated rod 203 whereby the head 204 of said rod enters one of the recesses in rack 168 and the inner end of said rod moves inward, through opening 189′ in conduit 189, and obstructs said conduit to prevent the passage of another package therethrough. When rod 203 thus moves inward lever 209 is actuated to move rod 208 outward through its slot in casing 210 until this rod 208 disengages pawl 212 of the press button 211 whereby the downward movement of said button, to press down the particular stop 189 with which the plate 214 of said button 211 is then engaged, is permitted. It will thus be apparent that no second package can pass down conduit 189 until rod 203 is withdrawn from said conduit and no automatic means is provided to effect this movement of rod 203 while carriage 175 remains in one position; hence it is evident that if the operative at this time inadvertently removes the wrapper $a$ and its contents from the seventh, or other, stacking mechanism and attempts to pass said wrapper through conduit 189 the end of rod 203 will prevent the passage of said wrapper and the delivery of such package to the sixth chute or package receptacle 172 will be prevented. The operative now presses down the button 211 thus depressing the particular stop 169 until its shoulder 170 is below the end 220 of pawl 218 whereupon the drawing action of weight 179 is permitted to effect the drawing forward of the carriage 175 and, after the extension 216 of plate 214 moves past said particular stop such stop is free to move upward under the action of its spring. The continued movement of the carriage ultimately brings the forward edge of plate 214 against the next of the stops 169 and said plate may swing on its pivot to permit the lower end thereof to ride over the top of said stop 169 and to swing into the position shown in Fig. 17, the undue swinging of plate 214 being prevented by the finger 219 contacting with the upper wall of its slot 213 and the further movement of the carriage being prevented by the lower end of pawl 218 which engages the stop toward which it is moved. During this forward movement of the carriage 175 the head 204 of rod 203 rides outward against the inclined edge of the depression, of rack 168, in which said head is located and this movement of rod 203 is transmitted by lever 209 to rod 208 to move the latter rod in the opposite direction whereby the end of rod 208 is engaged with the pawl 212 of push button 211 and said button can be released from said engagement by the swinging of lever 205 which is accomplished by the passage of a package through conduit 189, hence it is impractical for the operative to effect more than one movement of the carriage 175 without passing a package through said conduit and he cannot pass over one of the chutes 172 without depositing a package. After the carriage 175 has been thus moved over the entire series of chutes or package receptacles 172 said carriage is drawn backward until its conduit 189 again registers with the first of said series of chutes 172 and the process of assorting another series of packages is or may be proceeded with.

It is of course evident that the cylinder 21 may represent any other known mechanism for positively delivering articles or disks to the pneumatic carrier.

Having thus described my invention I claim as new and desire to secure by Letters Patent—

1. The combination with disk carrying means adapted to receive a series of disks in succession, of a series of disk packaging means, and mechanism for simultaneously moving all disks of said series edgewise from the disk carrying means toward said packaging means.

2. The combination with a machine for delivering disks at a predetermined point, of disk carrying means moving by said point, a series of disk stacking means and means for simultaneously moving a number of said disks edgewise from the disk carrying means toward said series of disk stacking means.

3. The combination with a machine for delivering disks at a predetermined point, of a series of receptacles for said disks arranged in order corresponding to the order in which said disks are delivered at said point of delivery, and mechanism operating to take said disks in succession at said point of delivery, to carry forward said disks, and to deliver a series of said disks simultaneously to said series of receptacles.

4. The combination with means for continuously feeding forward articles, of intermittently acting means for moving said articles laterally from the path in which they are fed forward, a receptacle supporting means located in said lateral path and having means for intercepting the articles, and means for moving said articles vertically in succession after they reach said supporting means.

5. The combination with means for continuously feeding forward articles, of intermittently acting means for moving said articles from the path in which they are fed forward, receiving means for said articles furnished with mechanism for supporting a stack of said articles, and means for moving upward the articles, after they reach said receiving means, to a point above said supporting means.

6. In combination, an endless conveyer belt having holes for an air exhaust, means for continuously driving said belt to present said holes in succession to the articles delivered adjacent thereto, an air exhaust, over which said conveyer passes, adapted to exhaust air through the holes of said conveyer whereby said thin articles are caused to adhere to said conveyer belt and are carried along thereby, a coating surface for coating said articles, a second endless conveyer belt having holes for an air exhaust and means for continuously driving said belt and presenting the holes successively to the articles held against the first belt, an air exhaust over which said second conveyer belt passes, adapted to exhaust the air through the holes of the second belt to cause the articles to adhere to said belt as long as required and be carried along by it bearing against a coating surface in passing, a coating surface for coating said articles carried against it, a scraping device arranged in proximity to the second belt and moving sufficiently close to the surface of the same to scrape the articles from the surface of the belt.

7. In combination, an endless conveyer belt having holes for an air exhaust, means for continuously driving said belt to present said holes in succession to the articles delivered adjacent thereto, an air exhaust, over which said conveyer passes, adapted to exhaust air through the holes of said conveyer whereby said thin articles are caused to adhere to said conveyer belt and are carried along thereby, a coating surface for coating said articles, a second endless conveyer belt having holes for an air exhaust and means for continuously driving said belt and presenting the holes successively to the articles held against the first belt, an air exhaust over which said second conveyer belt passes, adapted to exhaust the air through the holes of the second belt to cause the articles to adhere to said belt as long as required and be carried along by it bearing against a coating surface in passing, a coating surface for coating said articles carried against it, a scraping device arranged in proximity to the second belt and moving sufficiently close to the surface of the same to scrape the articles from the surface of the belt, and deliver them to feeding and stacking mechanism.

8. In combination, an endless conveyer belt having holes for an air exhaust, means for continuously driving said belt to present said holes in succession to the articles delivered adjacent thereto, an air exhaust, over which said conveyer passes, adapted to exhaust air through the holes of said conveyer whereby said thin articles are caused to adhere to said conveyer belt and are carried along thereby, a coating surface for coating said articles, a second endless conveyer belt having holes for an air exhaust and means for continuously driving said belt and presenting the holes successively to the articles held against the first belt, an air exhaust over which said second conveyer belt passes, adapted to exhaust the air through the holes of the second belt to cause the articles to adhere to said belt as long as required and be carried along by it bearing against a coating surface in passing, a coating surface for coating said articles carried against it, a scraping device arranged in proximity to the second belt and moving sufficiently close to the surface of the same to scrape the articles from the surface of the belt and deliver them to mechanism for delivering them to packages.

9. In combination, an endless conveyer belt having holes for an air exhaust, means for continuously driving said belt to present said holes in succession to the articles delivered adjacent thereto, an air exhaust, over which said conveyer passes, adapted to exhaust air through the holes of said conveyer whereby said thin articles are caused to adhere to said conveyer belt and are carried along thereby, a coating surface for coating said articles, a second endless conveyer belt having holes for an air exhaust and means for continuously driving said belt and presenting the holes successively to the articles held against the first belt, an air exhaust over which said second conveyer belt passes, adapted to exhaust the air through the holes of the second belt to cause the articles to adhere to said belt as long as required and be carried along by it bearing against a coating surface in passing, a coating surface for coating said articles carried against it, a scraping device arranged in proximity to the second belt and moving sufficiently close to the surface of the same to scrape the articles from the surface of the belt and feed rolls for receiving and feeding the articles onward to stacks, and a feed for feeding the stacks into packages.

10. A disk machine having in combination disk cutting and marking rolls and a pneumatic conveyer for taking the disks successively from the rolls and applying them to a surface bearing a finishing substance and carrying them to a position for removal from the conveyer and removing blades for removing a series of disks simultaneously from the pneumatic conveyer and delivering each of the series to a separate stacking device and devices for stacking the disks so delivered in separate stacks.

11. The combination with a conveyer belt for carrying thin articles, of a blade for pushing the articles from the belt said blade having a spring adjustment arranged to permit it to reciprocate evenly or unevenly as necessary to register itself automatically in contact with the belt and thus to engage with certainty with the articles to be removed.

HARRY A. SPILLER.

Witnesses:
 GEO. R. TOWER,
 JOHN ALDEN LEE.